Oct. 30, 1951      H. H. LAUCKS      2,573,457
MOTION TRANSMITTING DEVICE
Filed July 7, 1947
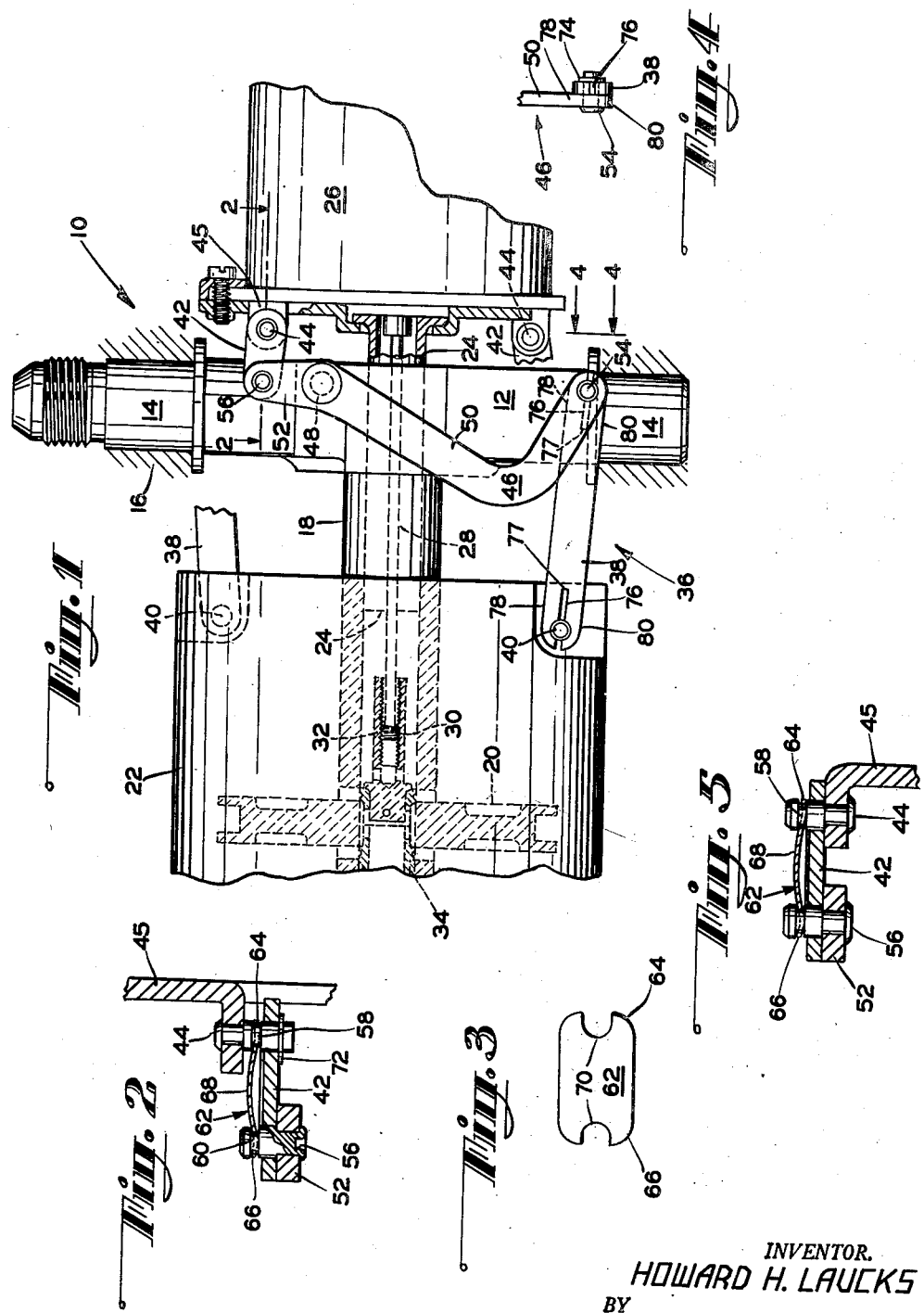
INVENTOR.
HOWARD H. LAUCKS
BY
Frederic H. Miller
-ATTORNEY- Patented Oct. 30, 1951

2,573,457

UNITED STATES PATENT OFFICE 2,573,457

MOTION TRANSMITTING DEVICE

Howard Hubert Laucks, Boonton, N. J., assignor to Bendix Aviation Corporation, Teterboro, N. J., a corporation of Delaware Application July 7, 1947, Serial No. 759,440

1 Claim. (Cl. 74—469)

The present invention relates to motion transmitting devices, and particularly to novel means for maintaining elements of such devices in effective transmitting relation to each other.

An object of the invention is to improve the transmitting relation as to back lash effect, and to do so by novel effective means.

Another object, as an adjunct to the back lash improvement or in combination therewith, is to provide the same in such novel form as to also operate as means for locking the elements together.

Another object is to provide novel elements adapted for ready attachment and detachment relative to each other.

Another object is to provide a novel device of the above-indicated character that is simple and durable in construction, economical to manufacture, and effective in its operation.

The above and other objects and features of the invention will appear more fully hereinafter from a consideration of the following description taken in connection with the accompanying drawings wherein several embodiments of the invention are illustrated by way of example.

In the drawing:

Figure 1 is a side view, partially in section, of portions of a structure embodying the invention;

Figure 2 is a view taken substantially along the line 2—2 of Figure 1;

Figure 3 is a detail view of an element of the structure;

Figure 4 is a view taken substantially in the direction of a line 4—4 of Figure 1; and Figure 5 is a view similar to Figure 2 of a modification of the structure thereof.

Referring to Figures 1, 2 and 4, a motion transmitting means or servo unit 10 comprises a support 12 having spaced bearing portions 14 adapted to be journaled in base means 16. A hollow piston shaft 18, fixed to the support 12, carries an integral piston 20 relative to which a cylinder 22 moves right and left, as viewed in the drawing. The cylinder is adapted to operate an elevator, flap or other aircraft movement control device.

A member 24 slidable in the shaft 18 is connected to a reversible motor 26 having a shaft 28 provided with a screw jack 30 cooperating with a screw 32 in a hollow valve member 34 for controlling the right and left hand movement of the cylinder 22.

Means 36, connected between the cylinder 22, the support 12 and the motor 26, is responsive to any movement of the cylinder 22 along the shaft 18 in either direction, for causing the motor shaft 28 to move the valve 34 to null position.

The means 36, in the example given, comprises a pair of relatively long flat-strap links 38 pivotally connected by pins 40 to the cylinder 22 at opposite sides of the support 12 and at opposite sides of the unit axis relative to each other, and a pair of short flat-strap link members 42 similarly pivoted, as by pins 44, to the motor 26, each at a side of the unit axis opposite to that of a corresponding one of the links 38, and a lever body 46 for each corresponding link 38 and link member 42 pivotally mounted, as by a pin or screw 48, on the support 12 having long and short arms 50 and 52, pivoted, as by pins 54 and 56, to the corresponding link 38 and link member 42, respectively.

The operation generally is such that, when the motor shaft 28 turns the screw jack 30, the latter moves the tubular valve 34 axially to control the above-mentioned right and left-hand movement of the cylinder 22, which movement is transmitted back to the motor 26 through the means 36 to impart axial thrust movement, through the shaft 28 and the screw jack 30, to the valve 34 until the latter reaches null position.

The above-described structure is one example of apparatus, wherein appreciable back lash must not exist, and to which the present invention effectively applies. It comprises, in one form, as shown at the upper portion of Figure 1 and in Figure 2, the flat-strap link member 42 having a transverse journal opening at each end for the pins 44 and 56, respectively. The pins 44 and 56, are adapted for position in each of the openings, for pivotally connecting the link member 42 to an associated body, which, in this instance in the case of the pin 44, is an element 45 of the motor 26, and, in the case of the pin 56, is the short arm 52 of the lever 46. The pins 44 and 56 have positioning grooves 58 and 60, respectively.

A resilient strap member 62, Figures 2 and 3, which in operative position is disposed in flat side-by-side relation to the link member 42, is provided with bifurcate or forked ends 64 and 66 adapted to straddle the pins 44 and 56, respectively, in the positioning grooves 58 and 60, respectively, with the member 62 having a slight bow 68 whereby it constantly oppositely forces the pins 44 and 56 laterally against the link 42 in resilient binding relation to the link.

The resilient strap member 62, prior to mounting, is provided, as indicated in Figure 3, with lateral or inner edges 70 disposed a greater distance apart than the adjacent bottoms of the grooves 58 and 60 of the pins 44 and 56, respectively, when the latter are operatively positioned. The member 62 is readily mountable by a simple movement first placing one of its ends in position and bowing the member to place its other end in position. The member may have an initial slight bow to facilitate its bowing in one direction. Removal of the member 62 is as readily effected.

It is noted in Figure 2, that the end 66 of the member 62 also functions a quick mounting and detaching means for locking the link member 42 in position axially of the pin 56, which may be fixed or loose relative to the link member 42, in the latter case of which, the pin is also locked by the end 66. In Figure 2, the groove 58 serves merely as positioning means for the member 62, with the pin 44 being held axially, as by a snap ring 72 in another groove of the pin.

In Figure 5, in which corresponding parts are designated by corresponding reference characters, the element 45 is at the same side of the link member 42 as the portion 52 of the lever 46, in which case both ends 66 and 64 of the member 62 function for locking the link member axially, with each acting as a pushing end for the other. The member 62 may be forked or equivalently formed at one end, and shaped at its other end whereby it may hold one or more than the two pins shown.

Referring to the bottom of Figure 1 and to Figure 4, the link 38 has an opening adjacent to each end, in which the pins 40 and 54 are located, pivotally connecting the link to an associated body. The pin 40 connects the body of the cylinder 22 to the link 38, and the pin 54 connects the long arm 50 of the lever body 46 to the link 38. Each pin 40 and 54 has a groove for a snap ring 74, Figure 4, holding the links and pins relative to each other axially of the pins.

A slit 76 substantially bisects the flat side of the link 38 from a point 77 inwardly of each opening of the pins 40 and 54 to the corresponding end of the link. The strap ends, at opposite sides 78 and 80 of the slits 76 are formed such as to be constantly urged toward each other in resilient binding relation to the pins 40 and 54.

Thus, in the structure of each form shown, the invention comprises the combination in the motion transmitting means 10, of a flat-strap link 38 or 42, having a transversal journal opening adjacent to each end, a pivot bearing pin adapted for position in each of the openings pivotally connecting the link 38 or 42 to an associated body about the pin axis, with the link and each of its pins being locked axially relative to each other and to the bodies, and laterally held in resilient binding relation to each other.

Although several embodiments of the invention have been illustrated and described, various changes in the form and relative arrangements of the parts may be made to suit requirements.

What is claimed is:

The combination in motion transmitting means, of a link of flat-strap material having an opening adjacent to each end, a pin adapted for position in each of said openings pivotally connecting the link to associated bodies and having a positioning groove, and a resilient strap member for flat side-by-side relation to the link having bifurcate ends adapted to straddle said pins in said grooves with the member slightly bowed and constantly oppositely forcing the pins laterally against the link in resilient binding relation thereto.

HOWARD HUBERT LAUCKS.

REFERENCES CITED

The following references are of record in the file of this patent:

UNITED STATES PATENTS

| Number | Name | Date |
| --- | --- | --- |
| 145,947 | Holly | Dec. 30, 1873 |
| 210,646 | Tornquist | Dec. 10, 1878 |
| 227,393 | Stanhope | May 11, 1880 |
| 422,489 | Arnold | Mar. 4, 1890 |
| 1,480,684 | Hudson | Jan. 15, 1924 |
| 1,509,031 | Sandstrom | Sept. 16, 1924 |
| 1,933,653 | Bremer | Nov. 7, 1933 |
| 1,947,421 | Mize | Feb. 13, 1934 |
| 2,118,736 | Odom | May 24, 1938 |
| 2,158,838 | Shakespeare | May 16, 1939 |
| 2,259,719 | Allen | Oct. 21, 1941 |
| 2,382,520 | Tinnerman | Aug. 14, 1945 |

FOREIGN PATENTS

| Number | Country | Date |
| --- | --- | --- |
| 406,579 | Great Britain | Mar. 1, 1934 |